UNITED STATES PATENT OFFICE 2,134,679

PROCESS FOR TREATING BIOLOGIC MATERIAL

Simeon C. Allen, Newton, Mass., assignor to Health Research Foundation, Inc., Boston, Mass., a corporation of Massachusetts No Drawing. Application October 17, 1935, Serial No. 45,521

4 Claims. (Cl. 167—58)

This invention relates to processes in which biologic materials, i. e., animal or vegetable cells, or structures of such cells, or parts or products thereof, are treated with oxidizing or reducing agents, as a means of improving them. By "improving them", is meant making them more desirable from the human viewpoint, e. g., if the material is diseased tissue in a human, restoring the tissue to health; if materials are pathogenic organisms in drinking water, destroying them; if materials are colored, where freedom from color is desired, removing colors, etc. Such improving may be purification, cleansing, bleaching, disinfection, sterilization, antisepsis, prevention and treatment of disease, etc. The object of this invention is to render such processes more expeditious, more effective, and in some cases to accomplish what has heretofore not been possible. By "animal or vegetable cells or structures of such cells" is meant animal or vegetable organisms, or constituent cells thereof, living, pathologic, or dead, ultramicroscopic, microscopic, or macroscopic, as viruses, bacteria, fungi, spores, protozoa, etc., up through the various forms of multi-tissue vegetable or animal organisms, such as plants or animals, including man. By "parts or products thereof" is meant any parts of the individual cells, or the tissues of any parts of such vegetable or animal organisms, or products derived thereof, retaining some cellular characteristics, as skin, fascia, muscle, bone, hair, hemp, cotton, linen, hides, leather, wood products, ivory, wool fur, cloth, etc. In processes referred to above it has been the practice to use the oxidizing or the reducing agents in manners which best accomplish the ends sought, but conditioned by attempted avoidance of undesirable changes in the substances, or of associated substances. For example in bleaching cotton or wool, the processes avoid treatment so vigorous as to destroy strength of the product, if the latter is intended for textile purposes [1,2]. Similarly the activity of disinfectants used to destroy spores of anthrax in wool are so regulated as not to destroy the value of the wool. Or in using chemical disinfectants about the body, account is taken of the fact, that body cells are in general more susceptible to the action of chemicals than are pathogenic organisms [3,4,5]. In some of the processes above referred to (purification, bleaching, etc.) it has been the practice on occasion, if the ends sought are not at first accomplished, to repeat such treatment, i. e. repeat the oxidizing treatment, or repeat the reducing treatment [6]. But it has not been the practice to repeat them alternately.

Surgeons have at times attempted (with questionable results [7,8], to sterilize their hands before operating, for example, by dipping them in a permanganate solution (oxidizing agent), then removing the brown stain on skin (oxide of manganese) by means of oxalic acid (reducing agent) [3].

I have found that if reducing treatment follow oxidizing treatment, then subsequent oxidizing treatment, or subsequent oxidizing and reducing treatments, alternated, accomplish ends sought, more expeditiously, more effectively, than oxidation or reduction processes heretofore in use, and accomplish certain ends heretofore not attainable. Reducing processes are similarly facilitated by alternate oxidizing treatments, but in general, not as markedly, as oxidizing processes are facilitated by alternating reducing treatments. In this process, either oxidation or reduction, may be first in the alternation. The phrase "alternate oxidation and reduction" in these specifications has the equivalent meaning, "alternate reduction and oxidation".

By oxidizing agent is meant one which may change an element or compound so that there is added a negative element or radical, or there is a decrease of the positive constituent (e. g. peroxides, permanganates, perchlorates, iodine, chlorine, etc.). By reducing agent is meant one which may change an element or compound so that there is withdrawn a negative element or radical, or there is an increase of the positive constituent (e. g. sulfur dioxide, sulfurous acid, formalin, chrysorobin, pyrogallic acid, etc.). No claim is made that all oxidizing agents will oxidize, or all reducing agents will reduce, all biologic materials, or that all oxidizing agents and all reducing agents will be effective in all circumstances, on all biologic materials, if used alternately. As may be expected with the wide variety of oxidizing agents and reducing agents, they do not work equally well in all circumstances. This process is applicable where either the oxidizing agent, or the reducing agent, or both, may, under suitable conditions, exert suitable respective actions on (1) the substances being treated, (2) each other, (3) the products of the other's reaction with the substances being treated.

Although this discovery applies to seemingly different arts, materials alternately oxidized and reduced by this process, have similar characteristics, and homologous structure, of common origin, in which characteristics may vary in degree, to wit: (1) similarity of cells, (2) similarity of structure of cells, (3) similarity of intracellular-extracellular relationships, (4) similarity of intercellular distances and spaces, (5) similarity of conditions under which the laws of surface tension, capillary action, viscosity, solution, colloidal solution, diffusion, osmosis, mass action, reversible reactions, dynamic equilibrium, change in electrical charge on oxidation and reduction, etc., govern the physical and chemical activities of substances in these intracellular and intercellular spaces.

The characteristics of these materials, fixing conditions under which these physico-chemical laws become large operative factors in the result, tend to obstruct the oxidation or reduction sought and make certain processes impractical. Reaction products vary with, oxidizing or reducing agents, the substances with which the agents react, and existing conditions, but in general they tend to obstruct further, oxidation or reduction. For example: (1) If soluble products are formed, their presence in the restricted spaces tend towards equilibrium, lesser reaction. (2) If insoluble products are formed they tend to, and may, practically completely, obstruct further reaction. (3) As a result of reaction, reaction products, and obstructions to diffusion and replacement of depleted active masses of reacting agents, the chemical agents tend to be weakest at sites of greatest resistance to further action. These sites may be intracellular or intercellular. (4) The frontiers of substance acted on by the oxidizing or reducing agents, have corresponding changed electrical charges, which tend to retard, acquirement of further similar charges, further chemical action. (5) Under certain conditions cells or organisms may acquire increased immunity or resistance to the oxidizing agents or to the reducing agents, so that either type of agent used alone, meets developed resistance. (6) At times the strengths or activities of the oxidizing or reducing agents necessary to overcome obstructions, cause such attendant objectionable damage, that processes are impractical. (7) At time the strengths or activities below which it is necessary to use the oxidizing or reducing agents, to avoid attendant objectionable damage, so retards the velocities of reaction, that processes are impractical.

This alternating oxidation reduction process, effects changes in the products of the previous reaction, cellular or intercellular, in content, composition, structure, or electrical charge. For example: (1) by removing or changing insoluble products of reaction, (2) by exposing to attack of oxidizing or reducing agent, at undepleted strength or activity at which it is being used, new frontiers of substance, (3) by freeing new frontiers of substance from retarding electrical charges, (4) by removing (through alternation), opportunity for certain cells or organisms to develop resistance to oxidation or reduction, (5) by increasing velocity of reaction, (6) by using when necessary, oxidizing or reducing agents at lower strength or activity.

This process is flexible, in that factors controlling the reaction may be controlled, e. g.: (1) physical states of the oxidizing or reducing agents, gas, liquid, solution, etc., (2) mediums in which agents are used, (3) concentration of agents, (4) hydrogen ion concentrations (pH), at which agents are used, (5) buffer substances, (6) catalytic agents, (7) temperatures at which reactions are carried out, (8) atmospheric pressures at which reactions are carried out; because of the structure of substances treated, atmospheric pressure, aside from being a direct factor in rate of reaction, is under certain conditions another considerable indirect factor in the extent of reaction. Increasing the atmospheric pressure over substances while exposed to chemical agents, aids in the penetration of the chemical agents; decreasing the atmospheric pressure over substances after a treatment with chemical agents, aids desirable elimination of chemical agents or other substances. The means of producing such atmospheric pressure changes are not novel, (9) time (durations of treatments), (10) time intervals (between treatments), (11) number of alternations (oxidation and reduction), (12) subdivisions of an oxidation or a reduction treatment (e. g. oxidation treatment divided into two or more periods of time, before reduction, or vice versa), (13) later oxidation or reduction may be effected by agents other than those used earlier, in the alternation.

Obstacles, or objections on practical grounds, to oxidation or reduction, mentioned above, associated with previous means, are largely overcome, by using this process.

The details, varying with cases, are in part variously explainable, theoretically. Actually the process works. The following are examples of practical applications of this alternating oxidation reduction process. In all these illustrative cases, potassium permanganate is used as oxidizing agent, sulfurous acid as reducing agent, merely to simplify exposition, for as stated above, other agents may be used. The permanganates are particularly valuable because of their great flexibility, through controllable factors described above (from the mildest oxidizing effect, to oxidizing diamond into carbon dioxide [9]). The perchlorates (isomorphs of permanganates) are also usefully controllable. For some uses, more particularly in certain medical conditions described below, certain properties of the permanganates give them special value.

For purification of infected water, a solution of potassium permanganate is added to the infected water till pink color persists on standing. Add sulfurous acid to pinked water in amount sufficient to decolorize pink color, and till the sulfurous acid is no longer used up by any products of the permanganate oxidation (hydrated manganese oxide is one of the products of such oxidation, insoluble, and an obstacle to diffusion and further reaction). The potassium permanganate oxidation treatment is then repeated. The amount of permanganate used in the second oxidation is more than that required merely to oxidize any sulfurous acid remaining.

The permanganate reduced by the sulfurous acid is quickly decolorized, and that permanganate used up by the organic impurities, is decolorized, more slowly. The amount of permanganate used up in this second oxidation, above that used to oxidize any sulfurous acid present, is used in oxidizing organic impurities, newly exposed to further oxidation by the preceding reduction treatment (sulfurous acid).

The oxidation and reduction may be repeated as many times as necessary, depending on the degree of infection or impurity, of the water being treated. When the permanganate of an oxidizing treatment is no longer decolorized slowly, after the prompt decolorization of that portion reduced by excess of sulfurous acid (from previous reduction treatment), the purification completed. Excess of permanganate may be neutralized by reducing agents, and if desired, solids may be removed by a coagulation or precipitation method.

Permanganates have been used for water purification, but not always successfully, to produce sterility. A single treatment with permanganate may for reasons outlined above, be a mere "surface" disinfectant of suspended matter, may merely oxidize and form an insoluble layer on the outside of plant or animal tissue, of encapsulated bacteria, or fungi, etc., or penetrate only part way through the cell wall of bacteria, yeasts, spores, etc., with deposition of an obstruction that prevents further penetration, oxidation, sterilization, purification[10]. Each reducing action by sulfurous acid, removes such obstruction, exposing new vulnerable frontiers of substance to succeeding oxidizing treatment, till the necessary penetration, oxidation, sterilization, and purification result.

Examples of bleaching by this process are bleaching linen and wool. Whereas, by prior methods, cotton can be bleached and finished in less than a week, linen requires repeated bleachings, and for finest whites, additional grassing, requiring about six weeks[6]. Many attempts have been made to shorten and cheapen the process, without success[6]. The use of stronger reagents and more drastic treatment, which would at first suggest itself, incurs risk to the fibre, in the destruction of its gloss. Too drastic treatment at the beginning, is liable to set the coloring matter in the fibre, so it is almost impossible to remove it[6]. Similarly, by prior methods, when using stronge oxidizing agents such as permanganates, the qualities of wool become greatly deteriorated[11]. When using permanganates on wool, the fibre acquires a harsh feel and a scroop, owing to the oxidizing action of the permanganate on the outer scales of the fibre[11]. By prior methods it is not practical to bleach black or brown wool to lighter than a golden color[12]. Using this process on linen and wool, deterioration is lessened, the time required for linen greatly shortened, and thereby cheapened, and the darker wool may be bleached lighter. Prepare linen for bleaching by usual scouring means, or by degreasing with a fat solvent, or by both. This solvent method is novel, reaches more readily the microscopic spaces containing fatty materials that interfere with penetration of chemicals. Treat linen in a solution of potassium permanganate, preferably less than 2.0% (0.2% to 0.5% preferred), containing preferably less than 0.10% sulfuric acid (0.01% to 0.02% preferred), at ordinary temperatures, till moderately stained. Oxidizing at much above 25° C., and too strong acid, may cause oxygen or carbon dioxide bubbles, and structural weakening. Rinse. Treat with dilute sulfurous acid solution, ordinary temperatures, till brown manganese oxide is dissolved. Rinse. Repeat oxidation and reduction, till sufficiently bleached. Rinse.

Similar treatment may be used in applying this process to wool. If speed is an objective, at the expense of other considerations, the oxidations may be carried on at greater concentration, higher temperature, lower pH (e. g. by making more acidic with sulfuric acid), higher pH (e. g. by making alkaline with borax or ammonia), by using a catalytic agent (e. g. chrome alum in neutral or acid permanganate), etc. With textile fibres such as linen, bleaching to complete white is more easily secured by using permanganate in an acid medium. In permanganate treatment of wool, whiteness is achieved better in acid medium; but deterioration is less if alkaline medium is used. Using similar means, this process may be used for purification, or for cleansing of biologic materials.

An example of sterilization by this process is sterilization of the hands. Even tincture of iodine is alleged to give a false sense of security[8]. The action of permanganate is considered superficial, and incapable of producing the results for which it is employed[13]. The evaluation of the present means of sterilization of the skin may be gaged by the wide practice of surgeons donning impervious sterile gloves, after "sterilization" of the hands, before operation, even when the gloves are not desired for the surgeon's own protection. Thoroughly cleanse hands with soap and water, rinse off soap completely, soak hands in hot potassium permanaganate solution acidified with about 0.02% sulfuric acid (preferred, but may be varied), for five or ten minutes. Rinse, then soak in dilute sulfurous acid solution, till all brown stains are cleared. Rinse. Repeat oxidation and reduction several times. Rinse with water.

An example of prevention and treatment of disease by this process, is the local treatment of infected or diseased tissue. Oxidizing and reducing agents, as disinfectants and antiseptics, used to destroy, weaken, or change foreign organisms or substances present, are not novel.

In general, disinfectants and antiseptics have not been successful in killing microorganisms in tissues of the body [14]. Against the tendency to use more powerful agents, has been the realization that the stronger the agent, the greater the danger of injuring living cells, and a movement in medicine has been away from the use of antiseptics, till the large number of infected wounds during the World War demonstrated the need for an antiseptic that was effective, and yet not damaging to body cells [15]. Swabbing with powerful agents, like tincture of iodine, or liquid carbolic acid, may produce only superficial asepsis, but does not reach organisms when they have had time to colonize in the wound [16]. The group of anaerobes causing gangrene are spore-bearers, and the spore-bearers are especially difficult to kill by any antiseptic solution, or even by boiling [16]. Permanganate, 0.1% solution disinfects very well, but its action is rapidly exhausted, and does not prevent secretions from retaining their virulence [17]. Tincture of iodine was said to have failed in the World War [16].

Carrel-Dakin treatment for infected open wounds and abscess cavities, is an application of repeated oxidation, in which reaction products on the surface of the tissue, in time separate or slough away from the subjacent living tissue, and is considered an effective treatment in special conditions [18]. But there are many conditions of local diseased tissue, in which even this treatment is not effective. By alternating reduction with oxidation, in processes like the Carrel-Dakin oxidation method, healing is accelerated. As alternate treatments result in progressively lessened obstruction to, and progressively more effective action of, the chemical agents used, the agents may be adjusted for progressively less reaction, with resultant lesser damage to normal tissue.

Besides general effects, described above, resulting from use of atmospheric pressure changes, decreasing the atmospheric pressure over diseased tissue, increases flow of lymph, an aid in healing, aids in reducing incidental damage to body cells, and aids in preventing systemic absorption of objectionable substances.

It is recognized that procedures which raise the general resistance of the individual, also tend to raise the local resistance to local disease. There is no claim that this process in itself heals tissue, but, this process, by freeing the diseased tissue of foreign organisms and material, and stimulating normal tissue, removes such harmful influences from the normal, stimulated tissue, so that the tissue is free to grow and function healthily. As a practical result, the time required to heal diseased tissue, is greatly shortened, certain diseased tissues of long chronicity, unresponsive to hitherto known treatments, respond to this process treatment. For prevention and treatment of disease, this process may be used in the treatment of normal, latently diseased, or manifestly diseased, tissues, that can be reached for treatment, in a practical manner, e. g., skin, abscess, wound, infected fracture, oral tissue, lungs, etc. This process may, through restoration to health, of local diseased tissue, aid in systemic, general, or other disease, physical or mental, to the extent that persistence of local diseased tissue is a causative factor, in the persistence of such other disease.

An example of this process is treatment of an infection of the skin. For this purpose, is described, a deep seated epidermophytosis of the hands, accentuated by secondary infection, and years of chronicity, with a record of failure of varied known treatments, directed by competent dermatologists. The failures are understandable, when one considers this diseased skin, with its six variously constituted layers, besides sweat glands, sebaceous glands, hair follicles, hair, blood, serum, lymph, nerves, fat, infecting organisms, detritus, etc., in stages from living to dead, with continual change, physical, chemical, biologic.

This ideally protective chaotic maze, permits large numbers of microorganisms to escape destruction, with a single escaping microorganism capable of multiplying in twelve hours, into millions. A complicated problem. Standard works on dermatology describe diseases of the skin, seemingly local infections, with treatments that may be attempted with hope, and admissions of ignorance of successful means of treatment. Potassium permanganate has been used as a disinfectant or antiseptic, for nearly a century. As used for conditions like these described, it is in no great repute, for it is unreliable, often ineffective. Utilizing potassium permanganate, the process described herein, contends with this complicated problem, successfully.

The hands are cleansed with soap and water. If recently treated with a fatty preparation, degreasing with a fat solvent will facilitate treatment. Fatty preparations, in common use by dermatologists, introduce particles that obstruct and interfere with the process, and should be avoided at all times during the course of treatment. Instead, or for protection of denuded or raw tissue, a greaseless ointment may be used, during periods of no treatment, and rinsed off before treatments. Treat hands till well stained (five or ten minutes), in comfortably hot potassium permanganate solution (0.1% to 0.2%, preferred), with pH a little below (preferred), or a little above pH of water (a little below, by adding about 0.01% sulfuric acid, or for sensitive skins, acidification with boric acid, or a little above, by making slightly alkaline with borax). Then treat hands with dilute sulfurous acid solution, with regulated pH, with or without a buffer. The oxidation and reduction are repeated. One series of treatments a day, proved sufficient in the cases tried. Removal of chemical agents from tissues, rinsing, after any treatment, is desirable. Reducing treatment, applied last, before a period of time without treatment, permits freer escape of lymph, aiding the natural defensive mechanisms of the body. As disease clears up, the action of the chemical agents is reduced. The same treatment may be used occasionally for prophylaxis, or for the prevention of recurrence. When to the feet of an individual, with or without signs or symptoms of fungus infection of the feet, but where toe-nail bodies, particularly of the outer toes, due to parasitic infection, are reduced to degenerate remnants, this process treatment is applied, the toe-nails grow, so that the nail-bed size is multiplied, and the appearance of the nail restored, approaching that of healthy nails of the hand.

The permanganates have been recognized as more effective than hydrogen peroxide for sloughing and infected wounds [15]. The particularly effective results experienced in its medical use, even in comparison with hypochlorite or chlorine treatments may be understood from the following considerations: (1) In diseased tissue there is usually a degree of local anoxemia of the cells of involved or associated tissue. (2) The relative manner of correction of that anoxemia, between chlorine liberating preparations (forming oxygen, only by a secondary reaction), and oxygen liberating permanganates, is that due to difference of oxygen "pressure". It is analogous to the difference between a candle burning in chlorine, with a dull flame, much soot, and one burning in oxygen, brilliantly, no soot. (3) In certain deficiencies of metabolism, uric acid in the body is not metabolized to the final stage, urea, at which it is normally eliminated. In tissues suffering from anoxemia, there is deficient metabolism, incomplete metabolism of uric acid to urea, excess of uric acid. (4) The "oxygen pressure" from permanganate (1) increases metabolism through oxygenation, and (2) at frontiers of interaction between permanganate and constituents of tissues, where as a result of original pH of permanganate, and incidental changes, the reaction is slightly "alkaline", the permanganate reacts, on uric acid to form allantoin [19]. (5) Allantoin (a constituent of the urinary secretion of surgical maggots), stimulates healing, with abundant growth of healthy granulation tissue in slowly healing suppurative wounds [20]. (6) This alternating process makes possible the above contacts, interchanges, reactions, results.

Prior attempts to utilize permanganates in the prevention and treatment of disease, have used neutral permanganates, and have not been notably successful. By changing the pH of permanganate solutions to either, above, or below, the pH of water, (1) the electrical potentials (voltage) for reduction of permanganates to manganese dioxide, are markedly changed, (2) the permanganates have a stronger latent oxygen pressure than oxygen itself, at one atmosphere of pressure, and as a result, these permanganate solutions effect desirable oxidation changes, that are not effected by the neutral permanganate solutions, used heretofore. Elevation of temperature produces marked increase of these characteristics in permanganate solutions, with pH above or below pH of water; and similar, but much less marked in neutral permanganate solutions. Permanganates in these specifications includes hydrogen permanganate (permanganic acid). And perchlorates include hydrogen perchlorate (perchloric acid). Using permanganates in this process, for medical applications, where tissues are observable, offers the means of distinguishing diseased from normal tissue, by the plainly visible differential degree of staining (manganese oxide). Through changes observed, progress may be noted, a valuable guide to treatment.

Since individuals, as well as causative factors of disease, vary so, the common product of their reaction, disease, varies greatly. But, contending with their common problems, this process, because of its method, and flexibility, is particularly applicable for the prevention and treatment of a wide variety of tissue diseases.

References: [1] M. S. Woolman & E. B. McGowan, Textiles (MacMillan, 1913) p. 270. [2] Encyclopedia Britannica, 14th, 3, 715. [3] W. A. Bastedo, Pharmacology (Saunders, 1920) p. 516. [4] R. Lambert, Journal of Amer. Medical Assn. 1900, 67, 1300. [5] Enc. Brit. 14th, 2, 78b. [6] Enc. Brit. 14th, 3, 715. [7] J. S. Simmons, Journal of Amer. Medical Assn., May 7, 1933, p. 726. [8] R. S. Havre, Journal of Amer. Medical Assn., Aug. 12, 1933, p. 534. [9] J. F. Durand, Compt, Rendu (1924), 178, 1822. [10] M. J. Rosenau, Preventive Medicine (1927), p. 1358. [11] J. M. Mathews, Textile Fibres (Wiley, 1913), p. 68. [12] Enc. Brit. 14th, 3, 715. [13] T. Sollman, Pharmacology (Saunders, 1917), p. 522. [14] Enc. Brit. 14th, 2, 79d. [15] Enc. Brit. 14th, 2, 78. [16] S. Rideal & E. K. Rideal, Chemical Disinfection and Sterilization (1921), p. 133. [17] S. Rideal & E. K. Rideal, Chemical Disinfection and Sterilization (1921), p. 71. [18] Enc. Brit. 14th, 6, 985b. [19] A. Claus, Ber., 7, 727 (1874). [20] W. Robinson, Journal of Bone and Joint Surgery, 17, 267 (April, 1935).

I claim:

1. The process of treating living tissue, on or in which pathogenic biologic materials exist, comprising alternately oxidizing and reducing said materials with a permanganate and a reducing agent, to a sufficiently limited degree, so that only a part of the improvement desired is accomplished in any alternate oxidation and reduction, so that a negligible amount of damage is done to unaffected tissue, and repeating said alternate oxidation and reduction a sufficient number of times to accomplish the treatment desired.

2. The process of treating living tissue, on or in which pathogenic biologic materials exist, comprising alternately oxidizing and reducing said materials with a permanganate and a sulphite, to a sufficiently limited degree so that only a part of the improvement desired is accomplished in any alternate oxidation and reduction, so that a negligible amount of damage is done to unaffected tissue, and repeating said alternate oxidation and reduction a sufficient number of times to accomplish the treatment desired.

3. The process of treating living tissue, on or in which pathogenic biologic materials exist, comprising alternately oxidizing and reducing said materials under conditions of hydrogen ion concentration differing from that of water with a permanganate and a reducing agent, to a sufficiently limited degree, so that only a part of the improvement desired is accomplished in any alternate oxidation and reduction, so that a negligible amount of damage is done to unaffected tissue, and repeating said alternate oxidation and reduction a sufficient number of times to accomplish the treatment desired.

4. The process of treating living tissue, on or in which pathogenic biologic materials exist, comprising alternately oxidizing and reducing said materials under conditions of hydrogen ion concentration less than that of water with a permanganate and a reducing agent, to a sufficiently limited degree, so that only a part of the improvement desired is accomplished in any alternate oxidation and reduction, so that a negligible amount of damage is done to unaffected tissue, and repeating said alternate oxidation and reduction a sufficient number of times to accomplish the treatment desired.

SIMEON C. ALLEN.